US006494087B2

(12) United States Patent
Hatano et al.

(10) Patent No.: US 6,494,087 B2
(45) Date of Patent: *Dec. 17, 2002

(54) MISFIRE STATE DISCRIMINATION SYSTEM OF INTERNAL COMBUSTION ENGINE

(75) Inventors: Gaku Hatano, Woko (JP); Yasunari Seki, Woko (JP); Yuji Fujiki, Woko (JP); Kojiro Tsutsumi, Woko (JP); Masahiro Yamada, Woko (JP); Hisashi Daicho, Woko (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,410

(22) Filed: Apr. 3, 1998

(65) Prior Publication Data

US 2002/0002858 A1 Jan. 10, 2002

(30) Foreign Application Priority Data

Apr. 4, 1997 (JP) .............................................. 9-102709

(51) Int. Cl.[7] .............................................. G01M 15/00
(52) U.S. Cl. .................................................... 73/117.3
(58) Field of Search ................................ 73/117.3, 116, 73/117.2, 118.1; 123/419, 436; 364/431.07, 431.08

(56) References Cited

U.S. PATENT DOCUMENTS

| 5,287,736 A | * | 2/1994 | Nakayama et al. ........... 73/116 |
| 5,375,462 A | | 12/1994 | Kuroda et al. |
| 5,471,870 A | * | 12/1995 | Kuroda et al. ............. 73/117.3 |
| 5,587,909 A | | 12/1996 | Matsumoto et al. |
| 5,606,120 A | * | 2/1997 | Daicho et al. ............. 73/117.3 |
| 5,689,065 A | * | 11/1997 | Kuroda et al. ............. 73/117.3 |
| 5,728,941 A | * | 3/1998 | Yamamoto et al. ........... 73/116 |
| 5,747,681 A | * | 5/1998 | Kuroda et al. ............. 73/117.3 |

FOREIGN PATENT DOCUMENTS

| GB | 2 244 516 A | 12/1991 |
| GB | 2 245 027 A | 12/1991 |
| JP | 4-209949 | 7/1992 |
| JP | 5-164033 | 6/1993 |
| JP | 7-063110 | 3/1995 |
| JP | 7-259632 | 10/1995 |

* cited by examiner

Primary Examiner—Eric S. McCall
(74) Attorney, Agent, or Firm—Arent Fox Kintner Plotkin & Kahn, PLLC

(57) ABSTRACT

A misfire state discrimination system of an internal combustion engine, which determines the occurrence of misfire under engine operating conditions that make misfire determination possible and counts the number of misfires to compare with a reference value. The misfire state of the engine is discriminated based on the result of comparison. In the system, when the engine operation moves from the conditions that makes the misfire determination possible, the count is saved and is counted up from the count when the engine operation returns to the condition. The saved count is also retained when the engine is stopped. Similarly, the number of combustion during which the determination of misfire occurrence is made is counted and the count is saved. This arrangement enables a rapid and accurate discrimination of the misfire state of the engine.

19 Claims, 7 Drawing Sheets

MISFIRE STATE DISCRIMINATION SYSTEM OF INTERNAL COMBUSTION ENGINE

BACKGROUND OF THE INVENTION

1. Field of the Invention

This invention relates to a misfire state discrimination system of an internal combustion engine, particularly to a misfire state discrimination system of a vehicle internal combustion engine.

2. Description of the Prior Art

In discriminating the misfire state of an internal combustion engine, the number of misfires detected during a prescribed number of consecutive ignitions (combustions) is counted and compared with a reference value to discriminate, for example, whether the engine is in a misfire state (has a misfire rate) that degrades the catalyst of the catalytic converter or is in a misfire state that markedly fouls the exhaust gas.

Technologies of this type are taught by, for example, Japanese Laid-open Patent Application Nos. Hei 7(1995)-63110, 7(1995)-259632, and 4(1992)-209949. These conventional methods judge a misfire state (misfire rate) by discriminating or determining misfiring from fluctuations in engine speed. Another method taught by Japanese Laid-open Patent Application No. Hei 5(1993)-164033 discriminates or determines the misfiring by judging based on the secondary voltage of the ignition system whether or not ion current is flowing across the spark plug gaps.

Since catalyst degradation accelerates sharply when the ambient temperature approaches the melting point of the catalyst (and the metal contained in the catalyst carrier), a requirement of a misfire state discrimination system is that it be capable of quickly discriminating a misfire state (misfire rate) resulting in such a temperature so as to prevent rapid catalyst degradation. Moreover, since a misfire rate of only a few percent sharply degrades the composition of the exhaust gas, even minor misfire states (misfire rates) must be discriminated with high accuracy so that corrective measures can be implemented. Rapid and high-accuracy discrimination of internal combustion engine misfire state (misfire rate) requires the number of misfires among an adequate number of firings discriminated for misfire to be determined in a short time period.

On the other hand, misfire discrimination or determination is impossible during many operating states or conditions of an internal combustion engine. For instance, misfire discrimination is impossible when the fuel supply is cut off, when the engine is being driven from the wheel side (during engine braking), during transient operation such as when the engine speed is rising or falling rapidly, and when engine output is being forcibly changed by external factors such as the wheels.

As seen, for example, in Japanese Laid-open Patent Application Nos. Hei 7-63110, 7-259632 etc. cited above, the prior art responds to the transition of engine operation to one of these states or conditions not allowing misfire discrimination by clearing the parameters calculated up to that time, including the number of ignitions discriminated for misfire, (i.e., by initializing the system).

When operating states or conditions that prevent misfire discrimination occur frequently, such as when the engine speed is repeatedly increased and decreased, therefore, the prior art needs a long time for misfire discrimination and cannot effect the discrimination rapidly and accurately.

An object of this invention is therefore to overcome the aforesaid drawbacks by providing a misfire state discrimination system of an internal combustion engine that, even in cases of frequent occurrence of operating states in which misfire cannot be discriminated or determined, enables a rapid and accurate discrimination of a misfire state upon return to an operating state or condition in which discrimination or determination of misfire is possible.

The conventional technologies discussed above also require a long period of time for misfire discrimination or determination and are incapable of rapid and accurate misfire state discrimination in cases where the engine is started and stopped repeatedly within a short time period.

Another object of the invention is to provide a misfire state discrimination system of an internal combustion engine that enables rapid and accurate discrimination of misfire state even when the engine is started and stopped repeatedly within a short time period.

SUMMARY OF THE INVENTION

This invention achieves these objects by providing, in one aspect, a system for discriminating a misfire state of an internal combustion engine, including engine operating condition determining means for determining whether an operation of the engine is under a condition that makes misfire determination possible, misfire determining means for determining whether a misfire has occurred in the engine when the engine operation is under the condition that makes misfire determination possible, combustion counting means for counting a number of combustions of the engine during which said misfire determining means determines whether the misfire has occurred, and misfire counting means for counting a number of misfires determined by said misfire determining means, and misfire state discriminating means for comparing the number of misfires counted by said misfire counting means with a reference value and for discriminating a misfire state of the engine based on a result of the comparison. In the system number saving means is provided for saving at least one of the number of combustions counted by said combustion counting means and the number of misfires counted by said misfire counting means, when the engine operation moves from the condition that makes misfire detection possible.

BRIEF EXPLANATION OF THE DRAWINGS

These and other objects and advantages of the invention will be more apparent from the following description and drawings, in which.

and

Figure 8:
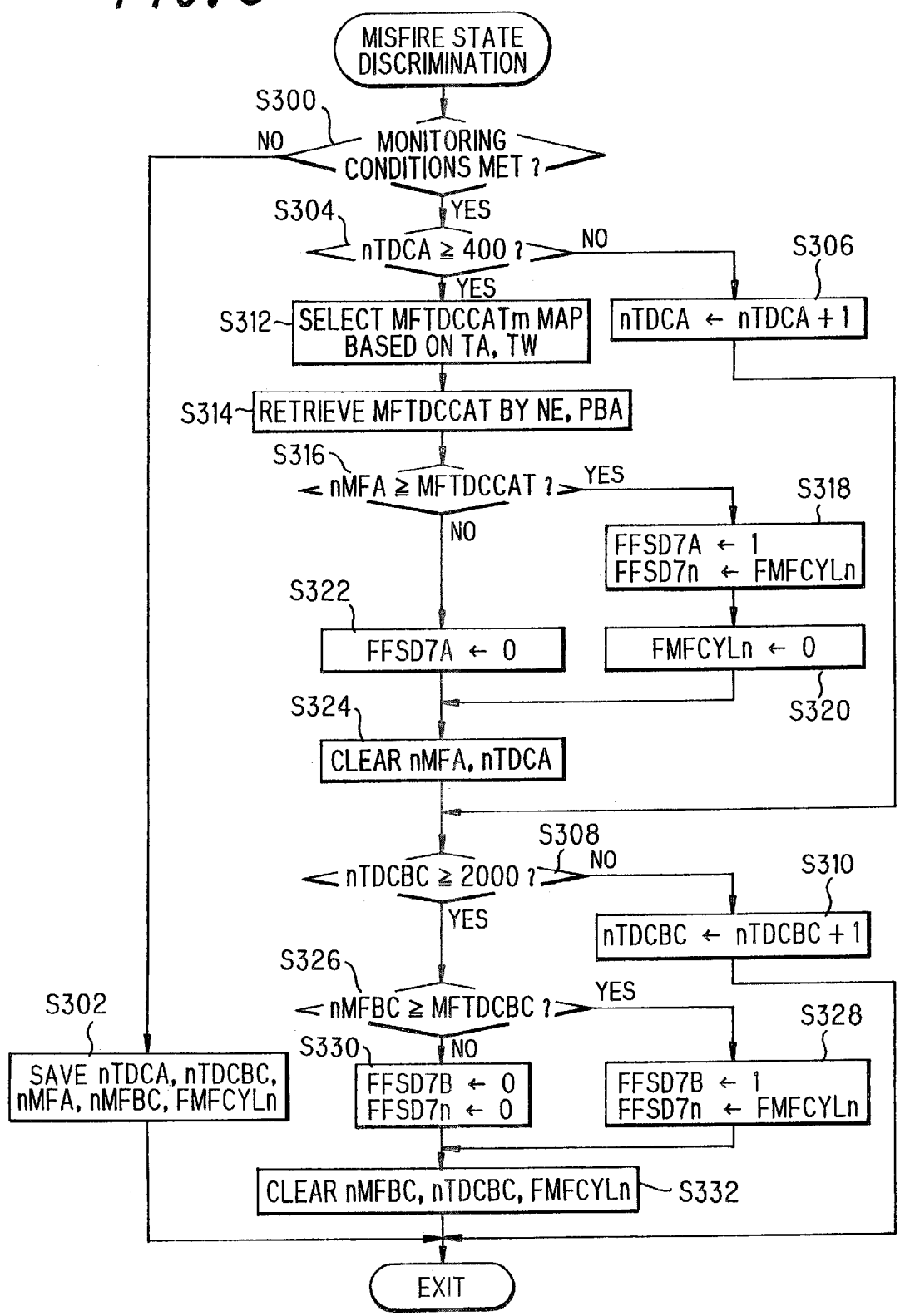
FIG. 8 is a flow chart showing the subroutine of the flow chart of FIG. 5 showing the processing for the discrimination of a misfire state.
Figure 10:
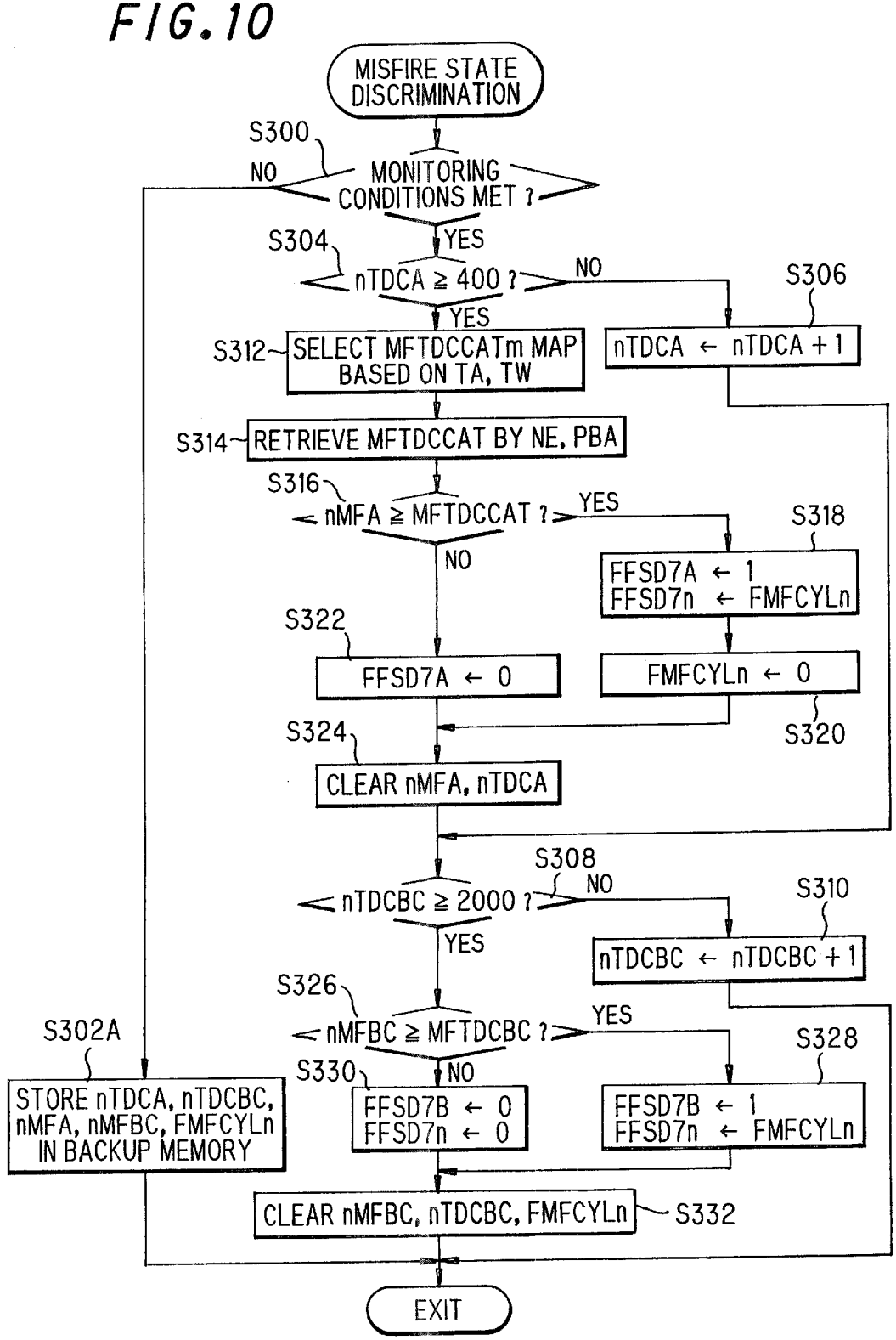

FIG. 10 is a view, similar to FIG. 8, but showing a misfire state discrimination system of an internal combustion engine according to a second embodiment of the invention.

DETAILED DESCRIPTION OF THE PREFERRED EMBODIMENTS

An embodiment of the invention will now be explained with reference to the attached drawings.

Figure 1:
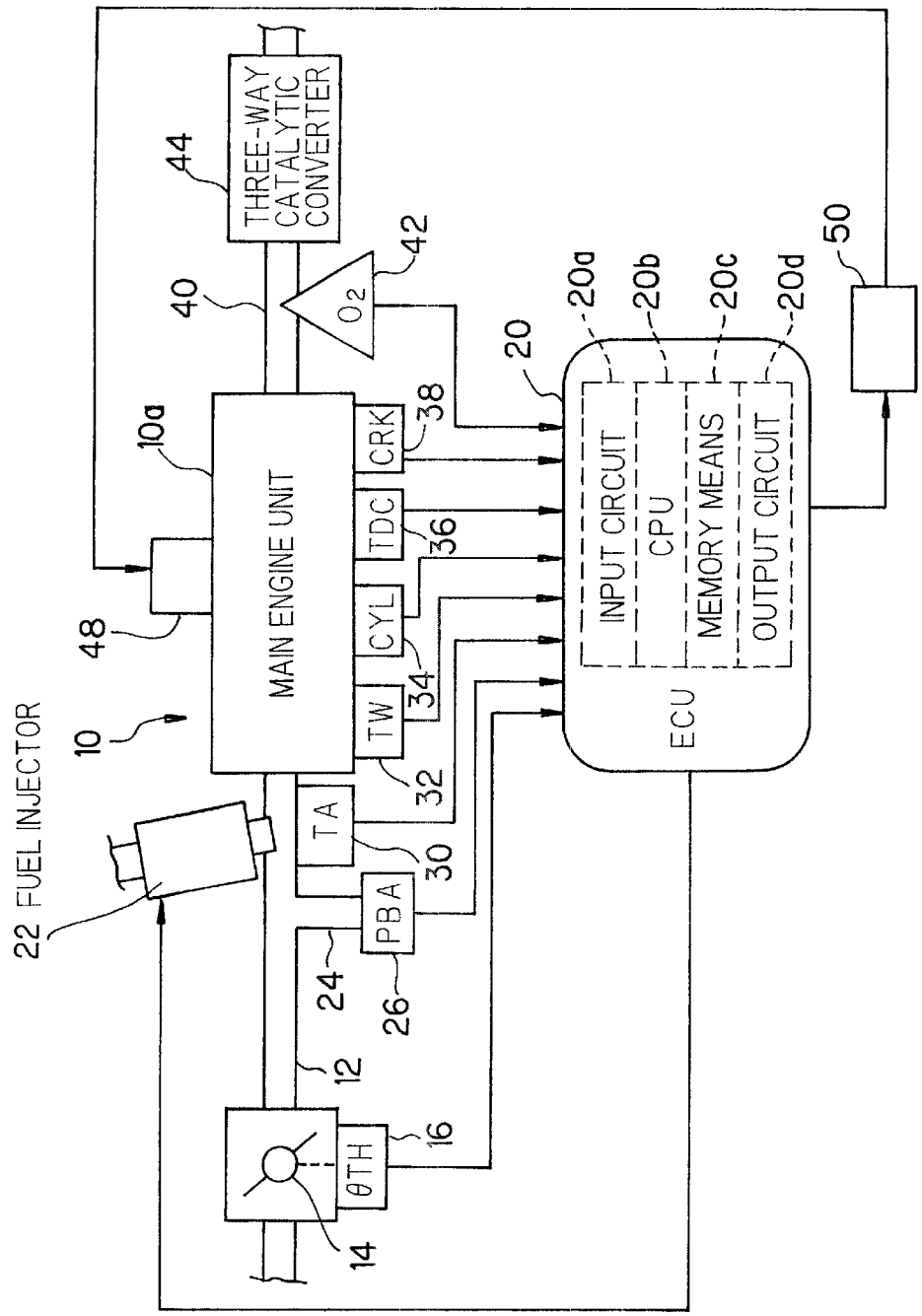
FIG. 1 is an overall schematic diagram of a misfire state discrimination system of an internal combustion engine according to the invention.

FIG. 1 is an overall schematic diagram of an internal combustion engine misfire state discrimination system according to the invention.

Reference numeral 10 in this figure designates a four-cylinder, four-cycle internal combustion engine. A throttle valve 14 is provided in an air intake pipe 12 connected to the main engine unit 10a of the engine 10. The throttle valve 14 has a throttle opening (θ TH) sensor 16 associated therewith for outputting an electric signal representing the amount of opening of the throttle valve 14 to an electronic control unit (ECU) 20.

The air intake pipe 12 forms an intake manifold (not shown) downstream of the point where the throttle valve 14 is installed. For each cylinder, a fuel injector 22 is provided in the intake manifold at a point upstream of an intake valve (not shown) of the cylinder. Each fuel injector 22 is supplied with pressurized fuel by a fuel pump (not shown) connected mechanically therewith and is also electrically connected with the ECU 20. The fuel injector 22 injects (supplies) the pressurized fuel into the cylinder during the period it is controlled to be open by the ECU 20.

An absolute pressure (PBA) sensor 26 is connected with the air intake pipe 12 through a branch pipe 24 at a point downstream of the throttle valve 14. The absolute pressure sensor 26 sends an electric signal corresponding to the pressure in the air intake pipe 12 (absolute intake pipe pressure) to the ECU 20. An intake air temperature (TA) sensor 30 is installed downstream of the absolute pressure sensor 30 for outputting an electric signal corresponding to the intake air temperature to the ECU 20. An engine coolant temperature (TW) sensor 32 is installed near a cooling water passage of the engine unit 10a for outputting an electric signal corresponding to the engine coolant temperature TW to the ECU 20.

A cylinder discrimination (CYL) sensor 34 is installed in the vicinity of the camshaft or crankshaft (neither shown) of the engine 10 for outputting to the ECU 20 a cylinder discrimination signal every time the cylinder pistons (not shown) reach a prescribed position.

A TDC (top dead center) sensor 36 is installed in the vicinity of the camshaft or crankshaft (neither shown) for outputting to the ECU 20 a TDC signal pulse once every crankangle associated with the TDC position of a piston. A crankangle (CRK) sensor 38 is similarly installed for outputting to the ECU 20 pulse signals at a shorter crankangle period (every 30°) than the period of the TDC signal pulses.

In the exhaust system of the engine 10, an air/fuel ratio ($O_2$) sensor 42 is installed at an appropriate portion of an exhaust pipe 40 connected to the exhaust manifold (not shown). The air/fuel ratio sensor 42 outputs a signal representing the oxygen concentration of the exhaust gas to the ECU 20. A three-way catalytic converter 44 is provided downstream of the air/fuel ratio sensor 42 for removing HC, CO and NOx components from the exhaust gas.

Spark plugs 48 associated with the respective combustion chambers (not shown) of the engine unit 10 are electrically connected with the ECU 20 through an ignition distributor 50.

The ECU 20 is a microcomputer comprising an input circuit 20a for receiving input signals from the aforesaid sensors and subjecting them to wave shaping, conversion to a prescribed voltage level and conversion from analog to digital form, a CPU (central processing unit) 20b, a memory means 20c for storing the processing programs executed by the CPU, processed data, etc., and an output circuit 20d.

The memory means 20c is a computer-readable medium composed of ROM and RAM (with backup section) and can be read by the computer (CPU 20b) using the programs represented by the flow charts of FIG. 2 and later figures explained later regarding system operation. (The ECU 20 can be a single-chip microcomputer or can be constituted of discrete components.)

As explained in greater depth later, the CPU 20b in the ECU 20 discriminates misfire (and misfire state), determines a fuel injection quantity (valve open time) and ignition timing, outputs valve opening signals through the output circuit 20d to the fuel injectors 22 to ensure the determined fuel injection quantity and ignition timing, and outputs ignition signals through the output circuit 20d and the ignition distributor 50 to the spark plugs 48.

The operation of the system will now be explained with reference to FIG. 2 and the following figures.

Figure 2:
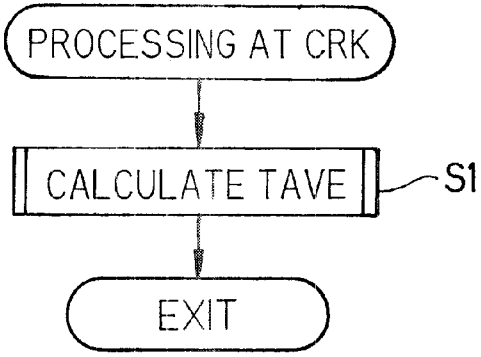
FIG. 2 is a flow chart showing the operation of the system, more specifically a flow chart showing the processing executed synchronously with the output of each CRK signal pulse.

FIG. 2 shows the processing at CRK executed synchronously with the output of each CRK signal pulse. This processing calculates the average interval between consecutive CRK signal pulses (this interval being inversely proportional to the engine speed), hereinafter referred to as the first average value TAVE.

Figure 3:
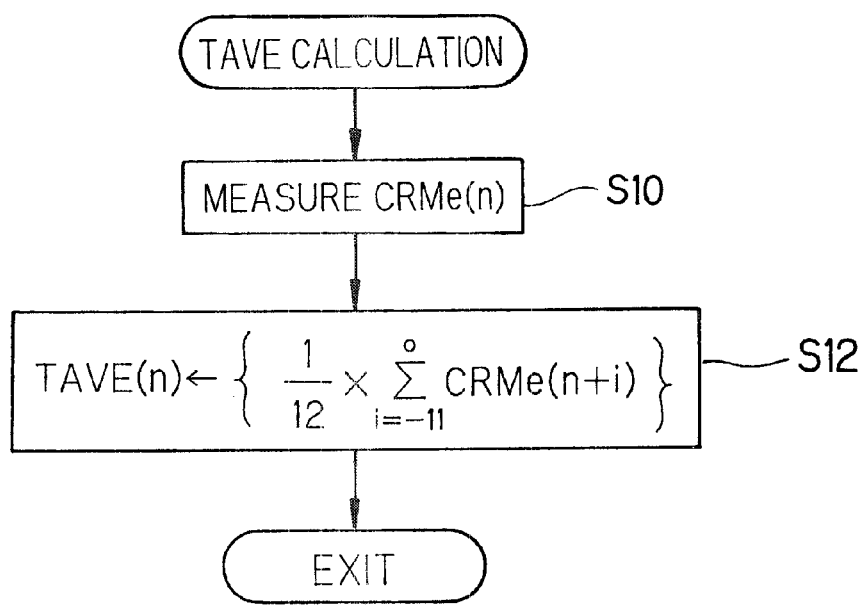
FIG. 3 is a flow chart showing the subroutine of the flow chart of FIG. 2 showing the calculation of the average interval between CRK signal pulses, referred to as the first average value TAVE.

FIG. 3 is a subroutine flow chart showing this processing.

Figure 4:
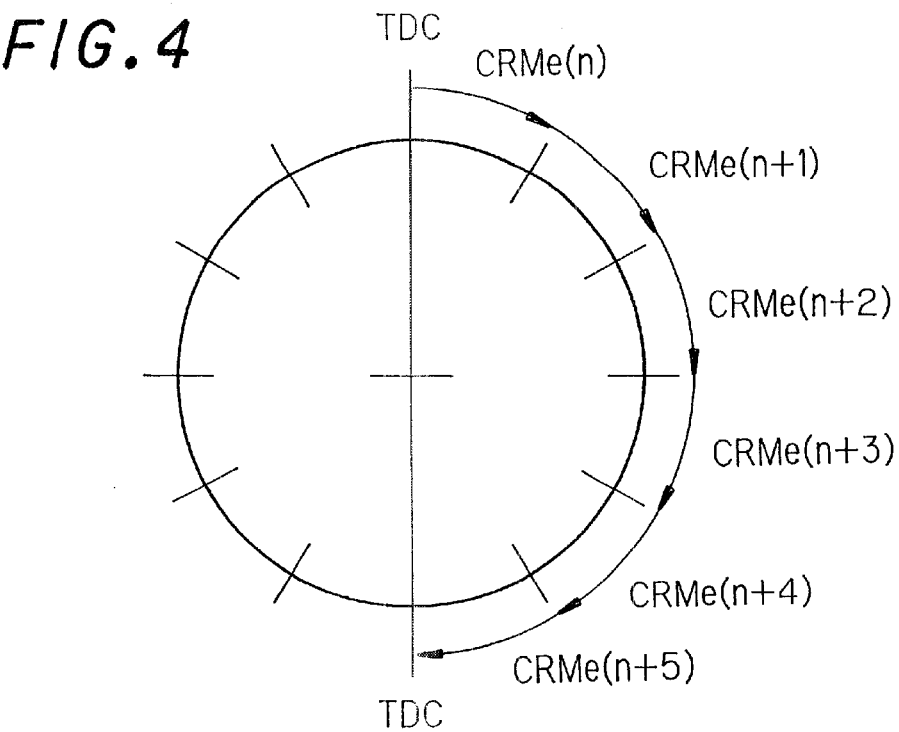
FIG. 4 is an explanatory view showing the operation in the flow chart of FIG. 3.

First, in S10, the occurrence time interval CRMe(n) of the CRK signal pulses is measured (n being the time point, i.e., the sampling number in the discrete time-series, namely, the starting time point of the flow chart of FIG. 2). Specifically, as shown in FIG. 4, the time intervals for every 30° of rotation of the crankshaft are successively measured as CRMe(n), CRMe(n+1), CRMe(n+2), . . .

Next, in S12, the average value of the 12 measured values of CRMe between CRMe(n−11) eleven times earlier and the most recent measured value CRMe(n) is calculated using Equation 1 to obtain first average value TAVE(n).

$$TAVE(n) = \frac{1}{12} \times \sum_{i=-11}^{0} CRMe(n+i) \qquad \text{Equation 1}$$

Since the CRK signal pulses are produced at every 30° rotation of the crankshaft, the first average value TAVE(n) is the average value over one rotation of the crankshaft. This averaging enables removal of first-order vibration components occurring periodically each engine revolution cycle of one crankshaft rotation, i.e., to remove noise components caused by mechanical error (manufacturing error, mounting error) of the pulser, pickup etc. of the crankangle sensor 38.

The ECU 20 calculates the engine speed NE from the value of TAVE(n).

Figure 5:
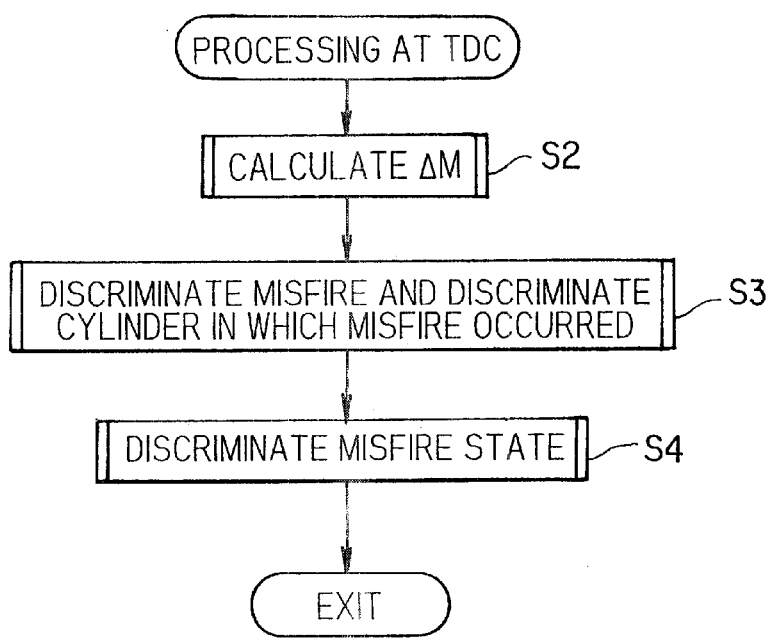
FIG. 5 is a flow chart showing the operation of the system, more specifically a flow chart showing the processing executed synchronously with the output of each TCC signal pulse.

FIG. 5 shows processing executed synchronously with the output of each TDC signal pulse.

First, the change ΔM in the average value M (second average value) of the first average values TAVE calculated by the CRK processing is calculated in S2.

Figure 6:
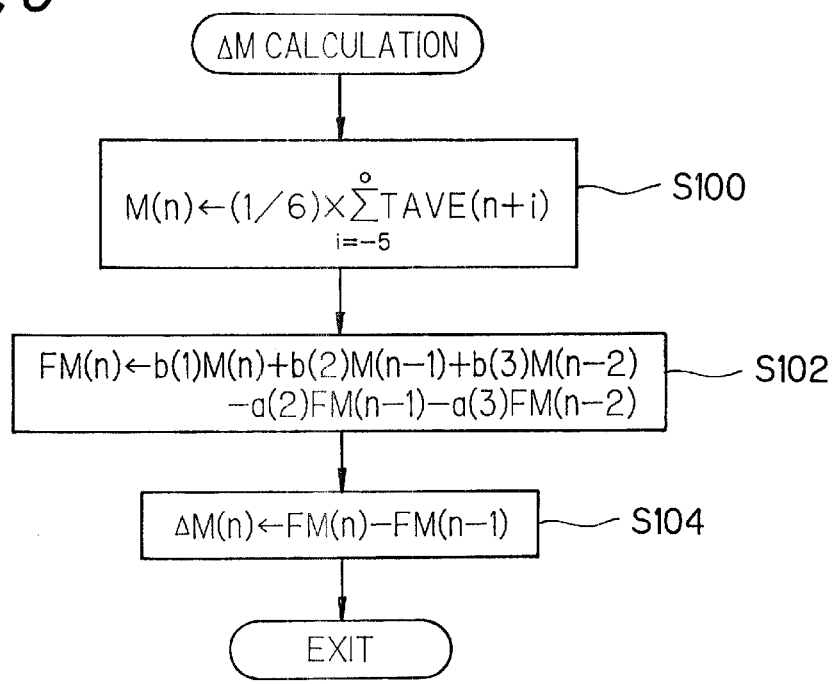
FIG. 6 is a flow chart showing the subroutine of the flow chart of FIG. 5 showing the calculation of the change ΔM(n) in the average value M(n) (referred to as the second average value) of the first average values TAVE.

FIG. 6 is a subroutine flow chart showing this processing.

First, in S100, six average values of the measured values CRMe, namely, those from the calculated value TAVE(n-5) (i.e., the first average value TAVE calculated five times earlier) to TAVE(n) (the most recently calculated value) are averaged using Equation 2 to obtain second average value M(n).

$$M(n) = \frac{1}{6} \times \sum_{i=-5}^{0} TAVE(n+i) \qquad \text{Equation 2}$$

Since the engine 10 of this embodiment is a four-cylinder, four-cycle engine, ignition occurs in one of the cylinders every 180° rotation of the crankshaft. The second average value M(n) is therefore the average value of the first average value TAVE(n) during each firing cycle.

This averaging enables removal of the second-order vibration components appearing as torque fluctuation components of the engine revolution caused by the power strokes, namely, removal of vibration components occurring periodically each one-half crankshaft rotation.

Next, in S102, high pass filter processing of the second average value M(n) is effected in accordance with Equation 3.

$$FM(n) = b(1) \times M(n) + b(2) \times M(n-1) + b(3) \times \\ M(n-2) - a(2) \times FM(n-1) - a(3) \times \\ FM(n-2) \qquad \text{Equation 3}$$

The second average value after the high pass filter processing is defined as FM(n).

In Equation 3, b(1), b(2), b(3), a(2) and a(3) are filter transfer coefficients set to, for example, 0.2096, −0.4192, 0.2096, 0.3557 and 0.1940. FM(0) and FM(1) are always made 0 and Equation 3 is applied when the value of n is 2 or greater.

This high pass processing removes low-frequency components below around 10 Hz contained in the value M(n), thereby preventing influence from vibration transmitted to the engine through the drive system, vibration caused by twisting of, for example, the crankshaft, road vibration transmitted through the wheels, and the like.

Next, in S104, the change ΔM(n) in the second average value FM(n) after high pass filter processing is calculated using Equation 4.

$$\Delta M(n) = FM(n) - FM(n-1) \qquad \text{Equation 4}$$

The sign (polarity) of the second average value FM(n) after high pass filter processing is opposite from the sign of the value of M(n). When the value of M(n) rises owing to misfiring in the engine 10, therefore, the value of FM(n) and the value of ΔM(n) both increase in the negative direction.

Next, processing for discrimination or determination of misfire and discrimination or determination of the cylinder in which misfire occurred is conducted in S3 of the flow chart of FIG. 5.

Figure 7:
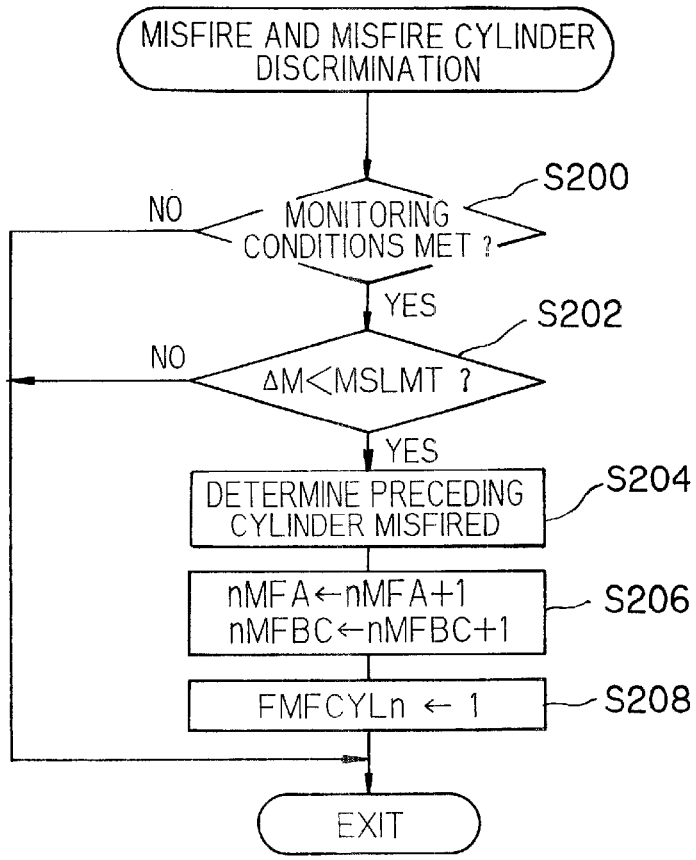
FIG. 7 is a flow chart showing the subroutine of the flow chart of FIG. 5 showing the processing for the discrimination or determination of misfire and discrimination of the cylinder in which misfire has occurred.

FIG. 7 is a subroutine flow chart showing this processing.

First, in S200, it is checked whether the conditions that permit monitoring are met. Namely, judgment is made as to whether or not the engine is in an operating state or condition that permits misfire discrimination or determination. For this, it is determined whether the engine is not operating in one of the aforesaid states or conditions that make misfire discrimination impossible, specifically, for example, whether it is operating in a state with the fuel supply cut off, in a state with the engine driven from the wheel side (engine braking state), in a transient state such as when the engine speed is rising or falling rapidly, or in a state with the engine output is being forcibly changed by external factors such as the wheels.

The conditions that permit monitoring are thus, for example, that the engine is operating steadily with the engine coolant temperature TW, the intake air temperature TA, engine speed NE etc. within prescribed ranges.

When the result in S200 is NO, the subroutine is immediately terminated. When it is YES, the program goes to S202, in which it is checked whether the change ΔM is smaller than a prescribed value MSLMT (negative value), specifically whether the absolute value of ΔM is greater than the absolute value of MSLMT.

The absolute value of the prescribed value MSLMT is read from a map (mapped data; not shown) using the engine speed NE and the absolute intake pipe pressure PBA (i.e., engine load) as address data. The prescribed value MSLMT is set to decrease with increasing engine speed NE and increase with increasing absolute intake pipe pressure PBA.

When the result in S202 is NO, the subroutine is immediately terminated. When the value of ΔM(n) has increased in the negative direction and the result in S202 becomes YES, the program goes to S204, in which it is determined that the cylinder that was to fire in the preceding cycle misfired and the bit of a flag FMFCYLn (n: cylinder number) indicating the cylinder that misfired is set to 1. (The cylinder that was to fire in the preceding cycle is the one determined to have misfired because of the delay caused by the high pass filter processing.)

Next, in step S206, the counts (numbers) of a first counter (nMFA counter) and a second counter (nMFBC counter) for counting the number of misfire ignitions are each increased by 1. Since the routine of FIG. 5 and the subroutine of FIG. 7 are activated by a TDC signal pulse, S206 counts the number of TDCs, i.e., the number of ignitions (or firings), in which misfiring was found to occur.

Next, in S4 of FIG. 5, the misfire state is discriminated.

FIG. 8 is a subroutine flow chart showing the processing of this job.

First, in S300, it is checked whether the conditions that permit monitoring are met. This processing is similar to that in S200 of FIG. 7. Namely, judgment is made as to whether or not the engine is in an operating state or condition that permits misfire discrimination or determination more specifically, that permits discrimination of a misfire state.

When the result in S300 is NO, the program goes to S302, in which the counts (numbers) of the first and second misfire counters (nMFA counter and nMFBC counter) and the counts (numbers) of a first counter (nTDCA counter) and a second counter (nTDCBC counter) for counting the number of combustions (number of discriminated ignitions) are saved in the memory means 20c of the ECU 20, whereafter the program is terminated.

After the engine 10 is stopped, if the ignition switch (not shown) is turned on again, the stored counts are initialized to zero. The value of the bit of the flag FMFCYLn is also simultaneously saved to memory in S302.

When the result in S300 is YES, the program goes to S304, in which it is checked whether the count of the first combustion (discriminated ignition) counter (nTDCA counter) is 400 or greater, i.e., whether misfire has been discriminated during 400 ignitions (number of TDCs or combustions).

The first time the routine of FIG. 5 and the subroutine of FIG. 8 are activated, the result in S304 is NO and the program goes to S306, in which the count of the counter concerned is incremented by 1. (Since the routine of FIG. 5 and the subroutine of FIG. 8 are activated every time a TDC signal pulse is input, S306 counts the number of TDCs, which is also the number of combustions (number of discriminated ignitions)).

Next, in S308, it is similarly checked whether the count of the second combustion (discriminated ignition) counter (nTDCBC counter) is 2000 or greater, i.e., whether misfire has been discriminated during 2000 ignitions or combustions (TDCs). The result is of course also NO and the program goes to S310, in which the count of the counter concerned is incremented by 1, whereafter the program is terminated.

In the course of repeating the foregoing procedures with every activation of the subroutine of FIG. 8, if it is found in S300 that the monitoring conditions are no longer met, the counts up to that time are saved (stored in memory) in S302. Later, when the result in S300 becomes YES (monitoring conditions are met) and the result in S304 is NO, the count is incremented in S306 by adding to the saved (stored) count. Similarly, in the subroutine of FIG. 7, when the result in S202 is YES and it is found in S204 that misfire has occurred, the program goes to S206, in which the saved (stored) counts nMFA and nMFBC are incremented by adding thereto.

When the number of subroutine repetitions (number of TDCs or combustions reaches or exceeds 400, the result in S304 becomes YES and the program goes to step S312, in which a first reference value MFTDCCATm map (mapped data; m:1–15) used for misfire state discrimination is selected based on the detected intake air temperature TA and engine coolant temperature TW.

Figure 9:
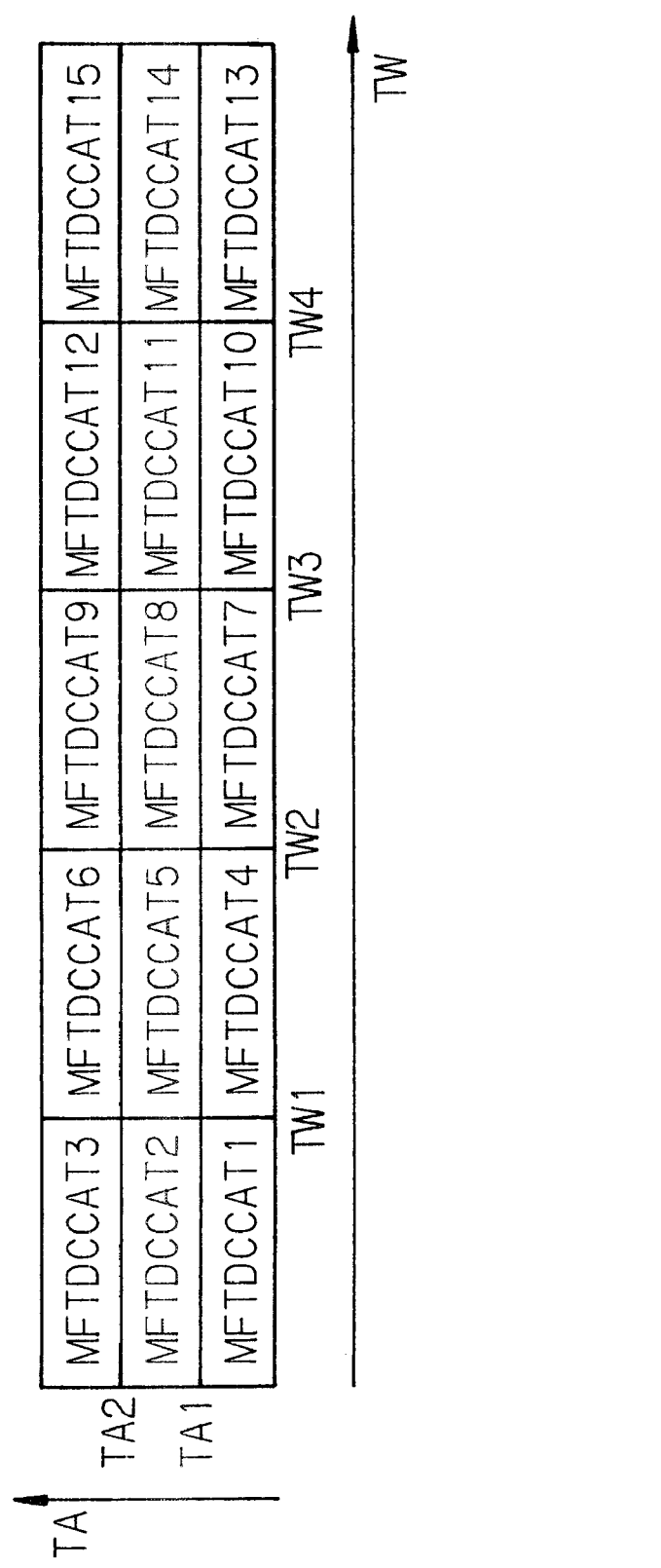
FIG. 9 is a diagram for explaining the properties of MFTDCCATm maps (mapped data) for misfire state discrimination used in the flow chart of FIG. 8.

FIG. 9 is a diagram for explaining the properties of the MFTDCCATm maps. As shown, 15 maps for misfire state discrimination, i.e., first reference value MFTDCCAT1 map to first reference value MFTDCCAT15 map, are established for 15 regions defined based on intake air temperature TA and engine coolant temperature TW. Although not shown in the drawings, retrieval from each of the MFTDCCATm maps is possible using the engine speed NE and the absolute intake pipe pressure PBA as address data.

As specific examples of the selection in S312, the MFTDCCAT1 map is selected when TA≦TA1 and TW≦TW1 and the MFTDCCAT8 is selected when TA1<TA≦TA2 and TW2<TW≦TW3. In the illustrated properties, TA1, 2 are, for example, around or approximately −50° C., +60° C., and TW1–4 are, for example, around or approximately −5° C., +20° C., +60° C. and +98° C.

By setting the reference values in this way, transient misfire states occurring when the engine is cold or during high-temperature restarting are prevented from being incorrectly discriminated as being persisting misfire states caused by an engine system abnormality.

Next, in S314, the first reference value MFTDCCAT is retrieved from the selected MFTDCCATm map using the detected engine speed NE and absolute intake pipe pressure PBA as address data.

Next, in S316, it is checked whether the count of the first misfire counter (nMFA counter) is equal to or greater than the retrieved first reference value MFTDCCAT.

When the result in S316 is YES, since this is taken to mean that the misfire state (combustion state) of the engine 10 is one that adversely affects the exhaust system components, the program goes to S318, in which the bit of a first anomaly flag FFSD7A is set to 1 and a flag FFSD7n indicating misfire discrimination or determination of the individual cylinders is updated (rewritten) by the flag FMFCYLn indicating the cylinder that misfired. Next, in S320, the bit of the flag FMFCYLn is reset to zero.

On the other hand, when the result in S316 is NO, since this is taken to mean that the misfire state (combustion state) of the engine 10 is not one that adversely affects the exhaust system components, the program goes to S322, in which the bit of the first anomaly flag FFSD7A is reset to zero.

Next, since the misfire state discrimination of 400 ignitions (firings) has been completed, the program goes to S324, in which the counts of the first counters (nMFA counter and nTDCA counter) are cleared, i.e., set to zero.

Next, in S308, it is checked whether the count of the second combustion (discriminated ignition) counter (nTDCBC counter) is 2000 or greater, i.e., whether misfire has been discriminated during 2000 ignitions (TDCs or combustions).

Since the result in S308 is naturally NO in the program cycle under discussion, the program goes to S310, in which the count of the counter is incremented by 1, whereafter the program is terminated. The foregoing procedures are thereafter repeated with every activation of the subroutine of FIG. 8. In the course of any of these repetitions, if the result in S300 is NO because the monitoring conditions are no longer met, the counts up to that time are saved in S302, while when the result in S300 is YES but the result in S308 is NO, the count saved in S310 is increased by addition, and when the result in S202 is YES and it is found in S204 that misfire has occurred, the saved (stored) counts nMFA and nMFBC are increased by addition in S206. This is the same as in the case of the 400 ignitions (combustions) explained regarding S304, S306 etc.

When the number of subroutine repetitions (number of TDCs or combustions) reaches or exceeds 2000, the result in S308 becomes YES and the program goes to step S326, in which it is checked whether the count of the second misfire counter (nMFBC counter) is equal to or greater than a second reference value MFTDCBC.

When the result in S326 is YES, since this is taken to mean that the engine 10 is in a misfire state (combustion state) that adversely affects the exhaust gas properties, the program goes to S328, in which the bit of a second anomaly flag FFSD7B is set to 1 and the flag FFSD7n indicating misfire discrimination or determination of the individual cylinders is updated (rewritten) by the flag FMFCYLn indicating the cylinder that misfired.

On the other hand, when the result in S326 is NO, the program goes to S330, in which the bit of the second anomaly flag FFSD7B is reset to zero and the bit of the flag FFSD7n is reset to zero.

Next, since the misfire state discrimination of 2000 ignitions (combustions) has been completed, the program goes to S332, in which the counts of the second counters (nMFBC counter and nTDCBC counter) are cleared (set to zero) and the bit of the flag FMFCYLn is reset to zero, whereafter the program is terminated.

As explained in the foregoing, this embodiment checks whether the conditions that permit monitoring are met. Namely, judgment is made as to whether or not the engine is in an operating state or condition that permits misfire (or misfire state) discrimination or determination. When the operating state or condition moves from an operating state that meets the monitoring conditions to one that does not, e.g., to an operating state in which the fuel supply is cut off, in which the engine is being driven from the wheel side (engine braking state), in which engine operation is transient such as when the engine speed is rising or falling rapidly, or in which the engine output is being forcibly changed by external factors such as the wheels, the counts of the firing (discriminated ignition) counters (nTDCA counter and nTDCBC counter) that count the number of firings (number of discriminated ignitions) and the counts of the misfire counters (nMFA counter and nMFBC counter) that count the number of misfire ignitions are saved by storing them in the memory means 20cy. When the conditions that permit monitoring are met again, counting is resumed and the new counts are added to the saved counts. With this arrangement, even if operating states that do not meet the monitoring conditions occur frequently, the misfire state can nevertheless be discriminated with good accuracy in a relatively short time so as to enable the taking of measures to prevent degradation of the catalyst of the catalytic converter and/or degradation of the exhaust gas composition.

FIG. 10 is a flow chart similar to that of FIG. 8 showing the misfire state discrimination processing according to a second embodiment of the invention.

Only the differences from the first embodiment will be explained. In the second embodiment, when it is found in S300 that the monitoring conditions are not met, the counts etc. are stored (saved) in the backup section of the RAM of the memory means 20c in S302A.

In the second embodiment, therefore, after the engine 10 is stopped, the counts are retained even when the ignition switch is turned on and the engine is restarted. When the conditions that permit monitoring are next met, therefore, counting is resumed and the new counts are added to the saved counts. Misfire state can therefore be promptly discriminated even in cases where the engine is repeatedly started and stopped within a short time period, such when the vehicle powered by the engine is repeatedly driven for short periods between starts.

In the configuration described in the foregoing, when the operating state moves from an operating state that meets the monitoring conditions to one that does not, the counts of the firing (discriminated ignition) counters (nTDCA counter and nTDCBC counter) that count the number of firings (number of discriminated ignitions) and the counts of the misfire counters (nMFA counter and nMFBC counter) that count the number of misfire ignitions are saved by storing them in the memory means 20c and when the conditions that permit monitoring are met again, counting is resumed and the new counts are added to the saved counts. Instead, however, it is possible to adopt a configuration wherein at least one set of counts between that consisting of the counts of the firing (discriminated ignition) counters (nTDCA counter and nTDCBC counter) and that consisting of the counts of the misfire counters (nMFA counter and nMFBC counter) are saved by storing them in the memory means 20c and when the conditions that permit monitoring are met again, counting is resumed and the new counts are added to the saved counts.

In the embodiments, thus, there is provided a system for discriminating misfire state of an internal combustion engine (10), including: engine operating condition determining means (ECU 20, S200, S300) for determining whether an operation of the engine is under a condition that makes misfire determination possible; misfire determining means (ECU 20, S3, S202) for determining whether a misfire has occurred in the engine when the engine operation is under the condition that makes misfire determination possible; combustion counting means (ECU 20, S306, S10) for counting a number of combustions (nTDCA, nTDCBC) of the engine during which said misfire determining means determines whether the misfire has occurred; misfire counting means (ECU 20, S206) for counting a number of misfires (nMFA, nMFABC) determined by said misfire determining means; and misfire state discriminating means (ECU 20, S4, S316, S326) for comparing the number of misfires (nMFA, nMFBC) counted by said misfire counting means with a reference value (MFTDCCAT, MFTDCBC) and for discriminating a misfire state of the engine based on a result of the comparison. In the system, number saving means (ECU 20, S302, S302A) is provided for saving at least one of the number of combustions counted (nTDCA, nTDCBC) by said combustion counting means and the number of misfires counted (nMFA, nMFBC) by said misfire counting means, when the engine operation moves from the condition that makes misfire detection possible.

It should be noted in the above that "a condition that makes misfire determination possible" is a condition or state under which the misfiring and/or misfire state (misfire rate) can be discriminated or determined. It should also be noted that "a number of combustions" means the number of power strokes or ignitions, specifically the number of TDCs, more specifically the number of combustions during which the occurrence or absence of misfiring is determined or discriminated.

The system is configured such that, at least one of said combustion counting means and said misfire counting means counts at least one of the number of combustion (nTDCA, nTDCBC) and the number of misfires (nMFA, nMFBC) by adding it to the saved number, when the engine operation again returns to the condition that makes misfire discrimination possible (S206, S306, S310).

The system is configured such that said number saving means retains at least one of the saved numbers (nTDCA, nTDCBC, nMFA, nMFABC) after the engine is stopped (S302A).

The system is configured such that said engine has a plurality of cylinders and said misfire state discriminating means discriminates the misfire state for each cylinder of the engine (10).

Also, there is provided a computer program embodied on a computer-readable memory (20c) for discriminating a misfire state for an internal combustion engine (10), including: determining whether an operation of the engine is under a condition that makes misfire determination possible (S200, S300); determining whether a misfire has occurred in the engine when the engine operation is under the condition that makes misfire determination possible (S3, S202); counting a number of combustions (nTDCA, nTDCBC) of the engine during which it is determined whether the misfire has occurred (S306, S310); counting a number of misfires determined (nMFA, nMFBC; S206); and comparing the number of misfires counted (nMFA, nMFBC) with a reference value (MFTDCCAT, MFTDCBC); discriminating a misfire state of the engine based on a result of the comparison (S4, S316, S326), and saving at least one of the number of combustions counted (nTDCA, nTDCBC) and the number of misfires counted (nMFA, nMFBC), when the engine operation moves from the condition that makes misfire detection possible (S302, S302A).

Further, it is configured to count at least one of the number of combustions and the number of misfires by adding it to the saved number, when the engine operation again returns to the condition that makes misfire discrimination possible (S206, S306, S310).

It should be noted in the foregoing embodiments, although the misfiring is determined or discriminated from the change in the engine speed, it is alternatively possible to determine or discriminate by detecting the presence or absence of ion current flow across the spark plug gaps or by detecting the in-cylinder pressure.

Although the invention has thus been shown and described with reference to specific embodiments, it should be noted that the invention is in no way limited to the details of the described arrangement, but changes and modifications may be made without departing from the scope of the invention, which is defined by the appended claims.

What is claimed is:

1. A system for discriminating a misfire state of an internal combustion engine, comprising:
    engine operating condition determining means for determining whether an operation of the engine is under a condition, including at least the absence of fuel supply cutoff, that makes misfire determination possible;
    misfire determining means connected to the engine operating condition determining means for determining that a misfire has occurred in the engine when the engine operation is under the condition that makes misfire determination possible;
    combustion counting means connected to said engine operating condition determining means for counting a number of combustions of the engine during a period when said engine operating condition makes misfire determination possible;
    misfire counting means connected to said engine operating condition determining means for counting a number of misfires determined by said misfire determining means;
    misfire state discriminating means connected to said engine operating condition determining means for comparing the number of misfires counted by said misfire counting means with a reference value when said number of combustions counted by said combustion counting means reaches a predetermined value and for discriminating a misfire state of the engine based on a result of the comparison; and
    number savings means connected to said engine operating condition determining means for saving the number of combustions counted by said combustion counting means and the number of misfires counted by said misfire counting means, when the engine operation moves from the condition that makes misfire detection possible.

2. A system according to claim 1, wherein said combustion counting means counts the number of combustions by adding said number of combustions to the saved number, when the engine operation again returns to the condition that makes misfire discrimination possible.

3. A system according to claim 1, wherein said misfire counting means counts the number of misfires by adding said number of misfires to the saved number, when the engine operation again returns to the condition that makes misfire discrimination possible.

4. A system according to claim 1, wherein said number saving means retains the saved number of combustions after the engine is stopped.

5. A system according to claim 2, wherein said number saving means retains the saved number of combustions after the engine is stopped.

6. A system according to claim 1, wherein said number saving means retains the saved number of misfires after the engine is stopped.

7. A system according to claim 3, wherein said number saving means retains the saved number of misfires after the engine is stopped.

8. A system according to claim 1, wherein said engine has a plurality of cylinders and said misfire state discriminating means discriminates the misfire state for each cylinder of the engine.

9. A method for discriminating a misfire state of an internal combustion engine, comprising the steps of:
    determining whether an operation of the engine is under a condition, including at least the absence of fuel supply cutoff, that makes misfire determination possible;
    determining that a misfire has occurred in the engine when the engine operation is under the condition that makes misfire determination possible;
    counting a number of combustions of the engine when the engine is operating under the condition where misfire determination is possible;
    counting a number of misfires determined;
    comparing the number of misfires determined;
    comparing the number of misfires counted with a reference value when said number of combustions reaches a predetermined value and discriminating a misfire state of the engine based on a result of the comparison; and
    saving the number of combustions counted and the number of misfires counted, when the engine operation moves from the condition that makes misfire detection possible.

10. A method according to claim 9, wherein
    counting the number of combustions by adding said number of combustions to the saved number, when the engine operation again returns to the condition that makes misfire discrimination possible.

11. A method according to claim 9, wherein
    counting the number of misfires by adding said number of misfires to the saved number, when the engine operation again returns to the condition that makes misfire discrimination possible.

12. A method according to claim 9, wherein
    retaining the saved number of combustions after the engine is stopped.

13. A method according to claim 10, wherein
    retaining the saved number of combustions after the engine is stopped.

14. A method according to claim 9, wherein
    retaining the saved number of misfires after the engine is stopped.

15. A method according to claim 11, wherein
    retaining the saved number of misfires after the engine is stopped.

16. A method according to claim 9, wherein the engine has a plurality of cylinders and discriminating the misfire state for each cylinder of the engine.

17. A computer program embodied on a computer-readable memory for discriminating a misfire state of an internal combustion engine, including:

determining whether an operation of the engine is under a condition, including at least the absence of fuel supply cutoff, that makes misfire determination possible;

determining that a misfire has occurred in the engine when the engine operation is under the condition that makes misfire determination possible;

counting a number of combustions of the engine when the engine is operating under the condition that makes misfire determination possible;

counting a number of misfires determined;

comparing the number of misfires counted with a reference value when the number of combustion reaches a predetermined value and discriminating a misfire state of the engine based on a result of the comparison; and saving the number of combustion counted and the number of misfires counted, when the engine operation moves from the condition that makes misfire detection possible.

18. A computer program according to claim 17, wherein counting at least one of the number of combustions and the number of misfires by adding at least one of the number of combustions and the number of misfires to the at least one of the saved numbers when the engine operation again returns to the condition that makes misfire discrimination possible.

19. A computer program according to claim 18, wherein retaining at least one of the saved number of combustions and misfires after the engine is stopped.

* * * * *